US008510741B2

(12) United States Patent
Leiserson et al.

(10) Patent No.: US 8,510,741 B2
(45) Date of Patent: Aug. 13, 2013

(54) COMPUTING THE PROCESSOR DESIRES OF JOBS IN AN ADAPTIVELY PARALLEL SCHEDULING ENVIRONMENT

(75) Inventors: Charles E. Leiserson, Cambridge, MA (US); Kunal Agrawal, Cambridge, MA (US); Wen-Jing Hsu, Singapore (SG); Yuxiong He, Singapore (SG)

(73) Assignees: Massachusetts Institute of Technology, Cambridge, MA (US); Nanyang Technological University, Singapore (SG)

( * ) Notice: Subject to any disclaimer, the term of this patent is extended or adjusted under 35 U.S.C. 154(b) by 1635 days.

(21) Appl. No.: 11/729,176

(22) Filed: Mar. 28, 2007

(65) Prior Publication Data
US 2008/0244588 A1 Oct. 2, 2008

(51) Int. Cl.
*G06F 9/46* (2006.01)
*G06F 15/173* (2006.01)

(52) U.S. Cl.
USPC ........... 718/104; 718/100; 718/102; 709/223; 709/224; 709/226

(58) Field of Classification Search
USPC .................................. 718/100, 102, 104, 105
See application file for complete search history.

(56) References Cited

U.S. PATENT DOCUMENTS

| | | | | |
|---|---|---|---|---|
| 5,384,906 A | * | 1/1995 | Horst ............................. | 713/375 |
| 5,485,613 A | * | 1/1996 | Engelstad et al. ................... | 1/1 |
| 5,493,664 A | * | 2/1996 | Doi ............................... | 711/100 |
| 5,539,916 A | * | 7/1996 | Yamasaki et al. ............... | 710/22 |
| 5,872,972 A | * | 2/1999 | Boland et al. ................ | 718/102 |
| 5,978,867 A | * | 11/1999 | Carmon et al. ................ | 710/25 |
| 6,085,218 A | * | 7/2000 | Carmon ........................ | 718/107 |
| 6,272,544 B1 | * | 8/2001 | Mullen ........................ | 709/226 |
| 6,292,822 B1 | * | 9/2001 | Hardwick ..................... | 718/105 |
| 6,301,616 B1 | * | 10/2001 | Pal et al. ....................... | 709/226 |
| 6,470,400 B1 | * | 10/2002 | Carmon et al. ................ | 710/25 |
| 6,735,613 B1 | * | 5/2004 | Jean-Dominique et al. .. | 718/104 |
| 6,996,822 B1 | * | 2/2006 | Willen et al. ................. | 718/102 |
| 7,092,985 B2 | * | 8/2006 | Hubbard ....................... | 709/201 |
| 7,127,716 B2 | * | 10/2006 | Jin et al. ....................... | 718/105 |
| 7,640,564 B2 | * | 12/2009 | Green et al. ................... | 725/58 |
| 8,127,010 B2 | * | 2/2012 | Sinha ........................... | 709/226 |

(Continued)

OTHER PUBLICATIONS

Blumofe et al, "Space-Efficient Scheduling of Multithreaded Computations", 1993, ACM, pp. 362-371.*

(Continued)

*Primary Examiner* — Emerson Puente
*Assistant Examiner* — Charles Swift
(74) *Attorney, Agent, or Firm* — Nields, Lemack & Frame, LLC

(57) ABSTRACT

The present invention describes a system and method for scheduling jobs on a multiprocessor system. The invention includes schedulers for use in both work-sharing and work-stealing environments. Each system utilizes a task scheduler using historical usage information, in conjunction with a job scheduler to achieve its results. In one embodiment, the task scheduler measures the time spent on various activities, in conjunction with its previous processor allocation or previous desire, to determine an indication of its current processor desire. In another embodiment of the present invention, the task scheduler measures the resources used by the job on various activities. Based on these measurements, the task scheduler determines the efficiency of the job and an indication of its current processor desire. In another embodiment, the task scheduler measures the resources consumed executing the job and determines its efficiency and an indication of its current processor desire.

33 Claims, 3 Drawing Sheets

(56) References Cited

U.S. PATENT DOCUMENTS

| | | | | |
|---|---|---|---|---|
| 8,239,869 | B2* | 8/2012 | Jensen et al. | 718/102 |
| 2001/0003187 | A1* | 6/2001 | Aoki et al. | 709/102 |
| 2002/0087611 | A1* | 7/2002 | Tanaka et al. | 709/1 |
| 2003/0177163 | A1* | 9/2003 | Nomura | 709/102 |
| 2003/0191795 | A1* | 10/2003 | Bernardin et al. | 709/105 |
| 2004/0015978 | A1* | 1/2004 | Orii | 718/105 |
| 2004/0054999 | A1* | 3/2004 | Willen et al. | 718/103 |
| 2004/0088702 | A1* | 5/2004 | Garthwaite et al. | 718/100 |
| 2004/0205759 | A1* | 10/2004 | Oka | 718/102 |
| 2005/0149932 | A1* | 7/2005 | Hasink et al. | 718/100 |
| 2005/0278722 | A1* | 12/2005 | Armstrong et al. | 718/104 |
| 2006/0090160 | A1* | 4/2006 | Forsythe et al. | 718/100 |
| 2006/0123423 | A1* | 6/2006 | Brenner | 718/105 |
| 2006/0174247 | A1* | 8/2006 | Farrell et al. | 718/104 |
| 2006/0206901 | A1* | 9/2006 | Chan | 718/107 |
| 2006/0225078 | A1* | 10/2006 | Anderson | 718/104 |

OTHER PUBLICATIONS

Agrawal et al, "An Empirical Evaluation of Work Stealing with Parallelism Feedback", Jul. 2006, IEEE, pp. 1-10.*

Agrawal et al, "AdaptiveWork Stealing with Parallelism Feedback", Mar. 14, 2007, pp. 112-120.*

Agrawal et al, "Work Stealing with Parallelism Feedback", Apr. 28, 2006, pp. 1-12.*

Sen, "Dynamic Processor Allocation for Adaptively Parallel Work-Stealing Jobs", Sep. 2004, pp. 1-82.*

Jovanovic, "Task Scheduling in Distributed Systems by Work Stealing and Mugging—A Simulation Study", 2002, pp. 203-209.*

Blumofe et al, "Scheduling Multithreaded Computations by Work Stealing", 1994, pp. 1-29.*

Kunal Agrawal, Yuxiong He, Wen Jing Hsu and Charles E. Keiserson. "Adaptive Task Scheduling With Parallelism Feedback". In PPoPP, 2006.

Kunal Agrawal, Yuxiong He and Charles E. Leiseron. "An Empirical Evaluation of Work Stealing With Parallelism Feedback". In ICDCS, Jul. 2006.

Kunal Agrawal, Yuxiong He and Charles E. Leiseron. "Adaptive Work Stealing With Parallelism Feedback".PPoPP, 2007.

Yuxiong He, Wen-Jung Hsu and Charles E. Leiserson. "Provably Efficient Two-Level Adaptive Scheduling." In JSSPP, 2006.

Yuxiong He, Wen Jing Hsu and Charles E. Leiserson. "Provably Efficient Online Non-Clairvoyant Scheduling." In IPDPS, 2007.

Nimar S. Arora, Robert C. Blumofe and C. Greg Plaxton. "Thread Scheduling for Multiprogrammed Multiprocessors." In SPAA, pp. 119-129, Puerto Vallarata, Mexico 1998.

Robert D. Blumofe. "Executing Multithreaded Programs Efficiently." PhD thesis, Massachusetts Institute of Technology, 1995.

Robert D. Blumofe and Philip A. Lisiecki. "Adaptive and Reliable Parallel Computing on Networks of Workstations." In USENIX, pp. 133-147, Anaheim, California 1997.

Siddhartha Sen. "Dynamic Processor Allocation for Adaptively Parallel Jobs." Master's thesis, Massachusetts Institute of Technology, 2004. Master Thesis.

Xiaotie Deng, Nian Gu, Tim Brecht and KaiCheng Lu. "Preemptive Scheduling of Parallel Jobs on Multiprocessors." In SODA, pp. 159-167. Society for Industrial and Applied Mathematics, 1996.

B. Song. "Scheduling Adaptively Parallel Jobs." Master's thesis, Massachusetts Institute of Technology, 1998. Master Thesis.

Nian Gu. "Competitive Analysis of Dynamic Processor Allocation Strategies." Master's thesis, York University, 1995.

Thu D. Nguyen, Raj Vaswani and John Zahorjan. "Maximizing Speedup Through Self-Tuning of Processor Allocation." In IPPS, pp. 463-468, 1996.

Guy Blelloch, Phil Biggons and Yossi Matias. "Provably Efficient Scheduling for Languages with Fine-Grained Parallelism." Journal of the ACM, 46(2): 281-321, 1999.

Girija J. Narlikar and Guy E. Blelloch. "Space-efficient Scheduling of Nested Parallelism." ACM Transactions on Programming Languages and Systems, 21 (1): 138-173, 1999.

R.L. Graham. "Bounds on Multiprocessing Anomalies." SIAM Journal on Applied Mathematics, 17(2): 416-429, 1969.

Robert D. Blumofe, Christopher F. Joerg, Bradley C. Kuszmaul, Charles E. Leiserson, Keith H. Randall and Yuli Zhou. "Cilk: An Effcient Multithreaded Runtime System." Journal of Parallel and Distributed Computing, 37(1): 55-69, 1996.

Robert D. Blumofe and David S. Park. "Scheduling Large-Scale Parallel Computations on Networks of Workstations." In HPDC, pp. 96-105, San Francisco, California, 1994.

Cathy McCann, Raj Vaswani and John Zahorjan. "A Dynamic Processor Allocation Policy for Multiprogrammed Shared-Memory Multiprocessors." ACM Transactions on Computer Systems, 11(2): 146-178, 1993.

Andrew Tucker and Anoop Gupta. "Process Control and Scheduling Issues for Multiprogrammed Shared-Memory Multiprocessors." In SOSP, pp. 159-166, New York, NY USA, 1989, ACM Press.

Tim Brecht and Kaushik Guha. "Using Parallel Program Characteristics in Dynamic Multiprocessor Allocation Policies." Performance Evaluation, vol. 27 & 28, pp. 519-539, 1996.

Written Opinion of the International Preliminary Examining Authority mailed Oct. 11, 2011 in corresponding PCT application No. PCT/US08/03289, 8 pages.

* cited by examiner

| | | |
|---|---|---|
| Satisfied | $d_q \leftarrow d_{q-1} / \rho$<br><br>II | $d_q \leftarrow \rho \, d_{q-1}$<br><br>IV |
| Deprived | $d_q \leftarrow d_{q-1} / \rho$<br><br>I | $d_q \leftarrow d_{q-1}$<br><br>III |
| | Inefficient | Efficient |

| | | |
|---|---|---|
| Satisfied | $d_q \leftarrow d_{q-1} - \rho_2$<br>II | $d_q \leftarrow d_{q-1} + \rho_3$<br>IV |
| Deprived | $d_q \leftarrow d_{q-1} - \rho_1$<br>I | $d_q \leftarrow d_{q-1}$<br>III |
| | Inefficient | Efficient |

Figure 3

| | | | |
|---|---|---|---|
| Satisfied | $d_q \leftarrow d_{q-1}$, reduced as a function of $\rho_2$<br>II | $d_q \leftarrow d_{q-1}$<br>IV | $d_q \leftarrow d_{q-1}$, increased as a function of $\rho_4$<br>VI |
| Deprived | $d_q \leftarrow d_{q-1}$, reduced as a function of $\rho_1$<br>I | $d_q \leftarrow a_{q-1}$<br>III | $d_q \leftarrow d_{q-1}$, OR<br>$d_q \leftarrow a_{q-1}$, increased as a function of $\rho_3$<br>V |
| | Inefficient | Efficient | Highly Efficient |

Figure 4

| | | | |
|---|---|---|---|
| | $d_q \leftarrow a_{q-1}$, reduced as a function of $\rho_1$<br>I | $d_q \leftarrow a_{q-1}$<br>II | $d_q \leftarrow a_{q-1}$, increased as a function of $\rho_2$<br>III |
| | Inefficient | Efficient | Highly Efficient |

Figure 5

COMPUTING THE PROCESSOR DESIRES OF JOBS IN AN ADAPTIVELY PARALLEL SCHEDULING ENVIRONMENT

This invention was made with government support under grant numbers ACI0324974 and CNS0305606 awarded by the National Science Foundation. The government has certain rights in this invention.

BACKGROUND OF THE INVENTION

Since the first computer was created, optimizing the use of its processing power has been a priority, in both the academic and commercial world. Additionally, as multi-user operating systems permitted multiple users to share a single processing system, the question of how most effectively to share the processing resource among multiple users and multiple jobs became critical.

For computers having a single processor, most operating systems utilize some form of time-slicing, or time-sharing. In this scheme, the utilization of the processing resource is divided into small units of time. The operating system then determines the various jobs that wish to use the processing unit. These jobs may include user programs, device drivers, such as print spoolers, and system applications. During each slice or quantum of time, the operating system selects a specific job to be executed. Once that time quantum is completed, the operating system typically saves the current state of the executing job, and selects another job for execution. The process by which the operating system selects a particular job is implementation specific. Some operating systems may employ a round robin system, whereby each pending job is selected in a predetermined order, with each receiving an approximately equal amount of processing time. Other operating systems may employ a weighed round robin system, whereby certain jobs are considered to have higher (or lower) priority, and thus get an unequal amount of processing time, relative to the average.

In the case of a single processor system, the issues of scheduling jobs and determining priority and runtime are the responsibility of the operating system. Since the prioritization and scheduling is all performed by the operating system, the scheduler is said to be a single-level scheduler.

In multiprocessor systems, the problem of dividing the processors among the various jobs is more complex. A multiprocessor system is any machine or group of machines that has a collection of computational engines. The computational engine might be a physical processor, a virtual processor, a thread or a process. Thus a collection of processors might be a multicore chip, a hyperthreaded machine, a shared memory multiprocessor, a NUMA machine, a grid, a distributed memory machine, a VLIW processor, or a peer-to-peer machine (such as when computers are donated on the internet to a common process), etc. While the time-sharing approach described above is still somewhat applicable, it may not completely comprehend the parallelism of the system, or of the individual jobs, each of which may be made up of one or more serial tasks. Another method of job scheduling in multiprocessor system is known as space-sharing. In this mode, rather than dividing the jobs with respect to quanta of processing time, jobs are scheduled on sets of processors. In the simplest scheme, each job is assigned P/J processors on which to execute its tasks, where J is the number of jobs and P is the number of processors. This scheme is called equipartitioning. Note that using this, or other space-sharing algorithms, some of the jobs may receive non-integral allocations. For example, a job may receive 3.5 processors. In this case, the job has 3 full processors and one processor for half the time. Therefore, even though the overall scheme is space-sharing, it might have a time-sharing component in it. However, this simple scheme may prove to be unfair, or inefficient. A scheme is defined to be unfair if one or more jobs have fewer processors than they can utilize while other jobs have at least one more processor than this deprived job. A scheme is said to be inefficient if there are idle processors and some jobs have fewer processors than they can use. In other words, if the division of processors among jobs results in one or more jobs receiving more processors than they can use, and some jobs having fewer processors than they can use, the scheme is inefficient.

For multiple processor systems, there are a number of methods that can be used to allocate the processing resources between the various jobs. In one scenario, the operating system determines the partitioning of resources, as well as selecting the tasks of the job that will be run. Thus, similar to single processor systems, this is known as single level scheduling. However, single level scheduling has a number of known deficiencies. Specifically, although the operating system is aware of the system configuration and the number of available processors, it is typically unaware of the computational nature of the jobs that it is scheduling. For example, the job's parallelism may vary over time, as shown in FIG. 1. FIG. 1 shows an exemplary diagram of a parallel job, displayed as a directed acyclic graph of tasks. The tasks may be implemented by operating system or user level threads or by fibers or by any other means. A task may be as short as one instruction or may be composed of many instructions. Each of the bubbles represents a task, and the arrows between the bubbles represent interdependencies. As shown in FIG. 1, a job may begin as a single task $v_1$. During its execution, a task may spawn (create) or enable one or more new tasks. For examples, tasks $v_2$ and $v_3$ execute after task $v_1$ spawns or enables them. Once enabled, tasks $v_2$ and $v_3$ can execute independently in parallel. Additionally, it is possible that a task, such as $v_2$, also spawns additional tasks, such as $V_4, V_5$, and $v_6$. At some later point, a task may require the results of another task before it begin its execution. For example, task $v_8$ requires the results of tasks $v_5, v_6$ and $v_7$ before it can execute. The complexity of FIG. 1 illustrates several important properties of parallel jobs. First, job parallelism is a dynamic attribute. Note that originally, the job consisted of only $v_1$, the lone initial task, and its parallelism was just 1. Later, depending on the allocation of processors and the execution of each task, it is possible that several tasks could be simultaneously executing, and the job might have a high parallelism. Furthermore, there may be interdependencies between the various tasks of a job. For example, task $v_8$ cannot execute and remains blocked until tasks $v_5, v_6$ and $v_7$ finish. Typically, the operating system is unaware of the interdependencies and the parallelism of a particular job.

To overcome this limitation, some embodiments separate the scheduling task into two distinct parts. The first part, preferably performed by the operating system, performs the allocation of processors among the various requesting jobs. This part is referred to as the job scheduler. The second part, preferably performed by the jobs themselves, performs the determination of parallelism and the selection of which tasks are to be executed on the allocated processors. This part is referred to as the task scheduler. This configuration, utilizing two distinct components, is known as a two-level scheduler.

Schedulers can be defined as static or dynamic. A static scheduler allocates a particular number of processors to a job, and that allocation remains unchanged until the job has completed. For jobs whose parallelism is unknown in advance or may change during execution, this approach may waste processor cycles. If the job has more processors than it can effectively use, these processors will be underutilized. More advanced schedulers, or dynamic schedulers, are able to modify the allocation of processors to a particular job during the execution of that job. Furthermore, allocations may be changed based on factors external to the particular job. For example, as new jobs enter the system, processors may be re-allocated away from an existing job to allow the best overall system efficiency. The frequency with which the allocation of processors is adjusted is implementation specific. Typically, the time period must be short enough to effectively adapt to changes in the system performance and job parallelism. However, the time period should be long enough to amortize the overhead associated with the re-allocation process.

The job scheduler and the task scheduler interact to schedule the jobs on the processors. The task scheduler makes its requirements known to the job scheduler, which then balances all of the incoming requirements to determine its allocation. The job scheduler then informs the task schedulers of their allocation for the next time quantum. This allocation is typically equal to or less than the task scheduler's requirements.

One common algorithm used by job schedulers to allocate the available processors is known as dynamic equipartitioning. It is a modification of the equipartitioning algorithm described above. This algorithm attempts to maintain an equal allotment of processors between jobs, with the upper constraint that a job is never allocated more processors than it requests. For example, assume a 16-processor system with 4 jobs. With no other information, an equipartitioning algorithm will allocate 4 processors to each job. Suppose one of those jobs requests only a single processor. In that case, that job will receive one processor, and the remaining 15 processors will be divided among the remaining 3 jobs. Thus, each of the other jobs will receive an allocation of 5 processors. Similarly, if two jobs had each requested 2 processors; the remaining 2 jobs will equally share the remaining 12 processors. While equipartitioning is neither fair nor efficient, dynamic equipartitioning can be both fair and efficient.

While dynamic equipartitioning improves the allocation of available processors to the jobs, it requires an estimate of the job's processor requirements. Without such an input, the algorithm will simply divide the number of processors by the number of jobs, and allocate the same numbers of processors to each job, and behave like equipartitioning. Thus, to best allocate the processors, the job scheduler must have information concerning each job's processor requirements, also known as the job's desire. In one embodiment, the task scheduler typically generates the job's desire. Then, each task scheduler supplies the job scheduler with its desire and the job scheduler uses this information to perform the processor allocation. In another embodiment, the job scheduler calculates desire itself.

Using this desire information, it performs the allocation process and reallocates the processors to the requesting jobs. In one embodiment, this reallocation process is conducted at regular time intervals, or quanta. In another embodiment, this reallocation process is performed whenever a job encounters an event that modifies its desire. For example, the creation of a new task or the completion of a task would alter the job's desire and thereby invoke a new reallocation process.

Work can be created in a number of ways. First, new jobs can enter the computer system. Additionally, currently executing tasks may spawn new tasks, thereby creating more work. Typically, a job will have one or more ready queues, which are queued entries describing tasks that are ready and available for execution. Preferably, the number of ready queues is matched by the allocation of processors, such that each processor is assigned a ready queue. If the allocation of processors is less than the number of ready queues, one or more ready queues are left dormant or asleep, since there are no available processing resources to attend to them. There are two common methods by which work can be distributed.

The first method is known as work-sharing. In this scenario, a central dispatcher is responsible for distributing the work among the various ready queues. In this model, the dispatcher may query each of the executing processes to determine the state of its ready queue. Based on this feedback, the dispatcher selects the ready queue on which the new task will be placed. This decision may be based on estimated start time, the number of entries on the various ready queues or other parameters. While this model attempts to keep the load between processors balanced, it is not without major disadvantages. The major drawback is that to obtain the required information, the dispatcher is required to communicate with each of the executing processes. In a multiprocessor system, communication between processes should be minimized as much as possible, since it causes not just one, but multiple, processors to suspend the useful work that they were performing.

The second work distribution algorithm is known as work-stealing. As described above, each active processor preferably has a ready queue associated with it. Assume that a particular processor is currently executing a task. As that task spawns new tasks, those newly created tasks are pushed onto the associated ready queue. In another embodiment, the old thread is pushed onto the ready queue and the newly created task begins execution. Thus, the creation of a new task adds an entry to the ready queue of that processor. Similarly, when a task completes execution, the next entry on the ready queue is popped off and executed. Thus, termination or completion of a task results in the removal of an entry from the ready queue. A processor will remain busy as long as there are items on its associated ready queue. Since the ready queues are managed in a distributed manner, there is no system overhead associated with the creation or removal of tasks from the system. However, it is possible that a processor executes all of the items listed on its associated ready queue. In this scenario, the idle processor becomes a thief. It selects another processor's ready queue (called the victim) and attempts to obtain work by removing an item (or stealing) from that processor's ready queue. If there is work available, this is a successful steal, and the formerly idle processor begins working on the new task. If there is no work available, this is an unsuccessful steal, and the idle processor selects another victim and repeats the process.

The above described mechanisms and algorithms provide a basis for designing a scheduler for use with a multiprocessor system. These mechanisms and algorithms can be combined to create a multitude of schedulers, each with its own performance metrics. However, the most important consideration is how these algorithms are employed and modified to achieve optimal performance. A number of parameters can be used to measure the performance of a multiprocessor scheduler. Some examples include total time to completion (as compared to a theoretical minimum), number of wasted processor cycles or quanta, and number of steal cycles. Minimization of these parameters is typically an important goal of any scheduler.

SUMMARY OF THE INVENTION

The shortcomings of the prior art have been addressed by the present invention, which describes a system and method for scheduling jobs on a multiprocessor system. The invention includes schedulers for use in both work-sharing and work-stealing environments. Each system utilizes a task scheduler using historical usage information, in conjunction with a job scheduler to achieve its results. In one embodiment, the task scheduler measures the time spent on various activities, in conjunction with its previous processor allocation or previous desire, to determine an indication of its current processor desire. In another embodiment of the present invention, the task scheduler measures the resources used by the job on various activities. Based on these measurements, the task scheduler determines the efficiency of the job and an indication of its current processor desire. In another embodiment, the task scheduler measures the resources consumed executing the job and determines its efficiency and an indication of its current processor desire.

BRIEF DESCRIPTION OF DRAWINGS

FIG. 3 illustrates a second embodiment of a representative matrix showing the possible actions of the task scheduler;

FIG. 4 illustrates a third embodiment of a representative matrix showing the possible actions of the task scheduler;

FIG. 5 illustrates a fourth embodiment of a representative matrix showing the possible actions of the task scheduler.

DETAILED DESCRIPTION OF THE INVENTION

Figures 1, 2:
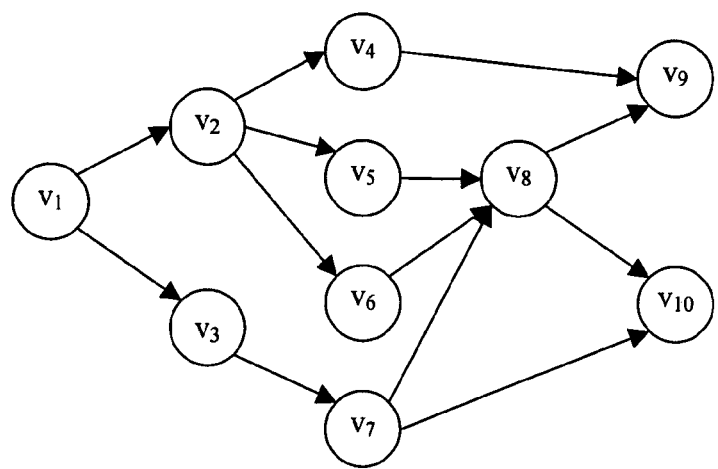
FIG. 1 represents a directed acyclic graph of a typical parallel job.
FIG. 2 illustrates a first embodiment of a representative matrix showing the possible actions of the task scheduler.

As described above, a two-level scheduler comprises one or more task schedulers, which preferably execute within the jobs, and a job scheduler, which preferably executes within the operating system. In the present invention, the task schedulers supply the job scheduler with an estimate of their processor usage, known as their desire. The job scheduler receives the inputted desires from the various task schedulers and, based on these inputs, determines the processor availability. It then allocates processors to the various jobs. In the preferred embodiment, a task scheduler will receive from the job scheduler an allocation of processors, which is the smaller of its requested desire or the processor availability as determined by the job scheduler. In the preferred embodiment, the task scheduler will generally not receive an allocation much greater than its desire, although such an allocation would be within the scope of the invention.

As described above, the task scheduler supplies the job scheduler with desired allocation information. The job scheduler then uses this desire information to perform the allocation process and reallocates the processors to the requesting jobs. To maximize the benefits of the present invention, these operations happen on a recurring basis. In one embodiment, this reallocation process is conducted at regular time intervals, or quanta. For example, a system timer may be employed to create uniform, fixed time intervals. In another embodiment, this reallocation process is performed whenever a job encounters an event that modifies its desire. For example, the creation of a new task or the completion of a task would alter the job's desire and thereby invoke a new reallocation process. Operationally, in the preferred embodiment, the task scheduler measures the time spent performing certain activities during the quantum, and supplies the job scheduler with an indication of the desired allocation at the end of the quantum.

The first aspect of the present invention provides a task scheduler for use in a work-sharing environment. As described earlier, this task scheduler makes use of historical parallelism data to estimate its desire for the next quantum. The task scheduler uses two types of information in determining its desire. The first is the allocation that the task scheduler received last quantum, as compared to its desire during that quantum. The second type of information is the overall efficiency of the job during that quantum. In other words, the task scheduler examines how efficiently the job utilized the processors that were allocated to it.

These two types of information can be used to create a two dimensional array or matrix. One axis is preferably a measure of utilization. It is readily understood by those of ordinary skill in the art that utilization and efficiency are closely related. Measuring the utilization of a job allows one to easily determine its efficiency. Thus, either utilization or efficiency can be used as this axis. This axis can be continuous, such as by graphing the utilization as a percentage. Alternatively, this axis may be divided into broader categories, such as efficient and inefficient. The use of percentages is self-explanatory and will not be further described. The use of broad categories requires the definition of those categories. As an example, a job may be categorized as inefficient if it utilizes less than $\delta$ percent of the available processor resource, where $\delta$ is the utilization parameter. Thus, a job would be categorized as efficient if it utilizes more than $\delta$ percent of the available processor resource. Additional categories can be added. For example, two constants, $\delta_1$ and $\delta_2$, can be used, where $\delta_1$ is less than $\delta_2$. Using two constants, 3 categories can be formed. The first category, known as inefficient, is defined as the utilization being less than $\delta_1$ percent of the available processor resource. The second category, known as highly efficient, is defined as the utilization being greater than $\delta_2$ percent of the available processor resource. The third category, known simply as efficient, is defined as utilization between $\delta_1$ and $\delta_2$ percent of the available resource. Obviously, more categories can be created and defined using this or a similar approach. Also, these utilization constants, $\delta$, $\delta_1$ and $\delta_2$, are not required to be fixed values. Rather these utilization parameters can be adaptive. For example, when the system is lightly loaded, the utilization parameter (or parameters) can be adjusted to smaller values. On the other hand, when the system is heavily loaded, the utilization parameter (or parameters) can be adjusted to larger values. When the system is lightly loaded, the total desire of jobs may be smaller than the total number of processors. Thus, there can be idle processors that are not allocated to any job, and these processors will surely be wasted. In this case, task schedulers of jobs should request processors more aggressively so that all processors will be assigned to jobs. One possible way to increase the desire more aggressively is to adjust the utilization parameter of jobs to some smaller value so that jobs are more likely to increase their desire by identifying their previous quantum as efficient, or highly efficient. On the other hand, when the system is heavily loaded, the jobs compete for processors. The utilization parameter can be adjusted large enough so that only the jobs that make most efficient use of the processors may request the same number or more processors in the next scheduling quantum.

The second type of information is the processor allocation, $a_{q-1}$, as compared to the requested desire during the previous time quantum, $d_{q-1}$. As above, this axis can be continuous, such as if expressed as a percentage, such as $a_{q-1}/d_{q-1}$. Alternatively, it can be expressed in broad categories, similar to the concept above. In one embodiment, two categories are created. The first category is called satisfied, and is defined as the processor allocation equal to (or greater than) the desire (i.e. $a_{q-1}=d_{q-1}$). The second category is called deprived and is defined as the allocation less than the desire (i.e. $a_{q-1}<d_{q-1}$). As above, additional categories can be defined, where the ratio of the two values is used to define these intermediate categories.

Based on this two dimensional matrix, the task scheduler calculates its desire for the next quantum, $d_q$. In one embodiment, the task scheduler supplies its desire based on the matrix shown in FIG. 2. This matrix uses the broad categories of efficient, inefficient, deprived and satisfied, each of which is defined above. The task scheduler calculates which of these four quadrants correctly describes the attributes of the job during the previous quantum. The task scheduler then computes the new desire based on the rules defined for that quadrant.

The lower left quadrant (I) defines the situation where the job was allocated fewer processor resources than it desired. Yet, despite the low allocation, the job was inefficient, thereby unable to utilize even this lower allocation fully. Thus, the task scheduler reduces its desire for the next quantum.

The upper left quadrant (II) defines the situation where the job was allocated the processor resources that it requested. However, the job was unable to utilize this allocation fully. Thus, the task scheduler reduces its desire for the next quantum.

The lower right quadrant (III) defines the situation where the job was allocated fewer processor resources than it desired. The job successfully utilized the allocated resources. In this case, the task scheduler maintains the same desire for the next quantum.

Finally, the upper right quadrant (IV) defines the situation where the job was allocated the processor resources desired and fully utilized those resources. In this situation, the task scheduler increases the desire of the job for the next quantum, since it is possible that the job could have successfully utilized even more processor resources, had they been allocated.

Note that this is only one embodiment of the task scheduler. Other variations of this matrix are possible and within the scope of the invention. For example, although FIG. 2 shows that the same action is taken in quadrants I and II, this is not a requirement. For example, the task scheduler may choose to reduce the desire more dramatically in quadrant I, since the job was unable to utilize an allocation less than previously desired. Additionally, although FIG. 2 shows a multiplicative relationship between the previous desire and the current desire, this relationship need not be employed. Other types of relationships, such as additive, exponential or other functions, can be applied, as shown in FIG. 3. Furthermore, FIG. 2 shows the use of a single constant $\rho$, which is called the responsiveness parameter. When the task scheduler wishes to reduce desire, it divides the previous desire by $\rho$. Similarly, when the task scheduler wishes to increase desire, it multiplies the previous desire by $\rho$. The use of a single parameter is not required by the present invention. Different parameters may be used in different quadrants, as desired. For example, the desire can be reduced by a larger amount if the job was deprived and inefficient, as opposed to satisfied and inefficient. Similarly, the amount of reduction (in quadrants I and II) need not be equal to the amount of increase (in quadrant IV). Different values can be used for all 4 quadrants, if desired. The responsiveness parameters need not be fixed, defined values. In one embodiment, these parameters are adaptive. For example, when a job's parallelism tends to increase or decrease dramatically, the responsiveness parameter can be adjusted to some larger value so that the desire of a job can quickly change to match its parallelism. Conversely, when a job's parallelism is rather stable, the responsiveness parameter can be tuned to some smaller value so that the job's desire does not fluctuate greatly. Finally, although the preferred embodiment leaves the desire unaffected in quadrant III, this is not required. The desire can be modified as necessary by the user.

FIG. 3 illustrates a second possible matrix detailing the actions taken by the task scheduler. In this embodiment, different constants are used, based on the quadrant. Furthermore, this matrix utilizes an additive relationship. Referring to FIG. 3, quadrant I represents the scenario where the job was unable to utilize the allotment of processors that it received, even though that allocation was less than its previous desire. In this case, the desire for the next scheduling quantum is reduced by a constant, $\rho_1$. Note that while this constant is being subtracted from the previous desire, the invention is not so limited. Similar to FIG. 2, the previous desire can be divided by a constant, or other relationships can be employed. In Quadrant II, the job is still inefficient; however this inefficiency was based on its desired allotment of processors. In this embodiment, the desire for the next scheduling quantum is reduced, although not as significantly as it was in Quadrant I. In other words, $\rho_2$ is less than $\rho_1$. In this embodiment, the behavior in Quadrant III is the same as was described in connection with FIG. 2. Finally, in Quadrant IV, the job efficiently used all of the processors that it desired. Thus, during the next scheduling quantum, its desire is increased by $\rho_3$, which may be equal to one of the previous constants, or a completely different value.

Furthermore, as described above, the resulting matrix need not be limited to four quadrants. Finer granularity in efficiency or utilization percentage may result in a matrix having an increased number of regions, or even a continuous variation where one region blends into its neighbors, any of which could be of infinitesimal size. Rules governing the calculation of desire for each region can be implemented as desired. As an example, FIG. 4 represents a matrix where the efficiency of the job is divided into 3 categories; inefficient, efficient, and highly efficient. This matrix shows the various actions to be taken based on the job's performance during the previous time quantum. It should be noted that although the new value of desire, $d_q$ is preferably based on the previous desire, $d_{q-1}$, this is not required. As an example, the new value of desire, $d_q$, can alternatively be based on the previous allocation, $a_{q-1}$, or a combination of the previous allocation, $a_{q-1}$, and the previous desire, $d_{q-1}$.

Such an example is shown in FIG. 4. In this scenario, utilization is divided into 3 categories; inefficient, efficient and highly efficient. These three categories are differentiated based on the job's utilization during the previous scheduling quantum. Inefficient is defined as the job's utilization being less than $\delta_1$, efficient is the job's utilization being between $\delta_1$ and $\delta_2$, while highly efficient is defined as the job's utilization being greater than $\delta_2$, where $\delta_1$ is less than $\delta_2$. The other dimension of this matrix is the same as it was with FIGS. 2 and 3, although further granularity in this dimension is possible as well. Box I is analogous to Quadrant I in the previous two matrices and therefore, is subjected to the greatest decrease. This decrease of $\rho_1$ can be a multiplicative, additive or other type of reduction, as described earlier. Box II is also similar to Quadrant II of the previous two matrices, and a similar action is taken. In this case, the reduction parameter is $\rho_2$, which is preferably less than or equal to $\rho_1$. Box III illustrates the scenario where the job did not receive its requested desire, but was efficient with the allocation that was received. In this scenario, the new desire is based on the previous allocation. The rationale in this case is that since the job was efficient at this allocation, it should continue at that desire. Box IV represents the scenario where the job was efficient at its requested desire. In this case, the desire remains unchanged. Box V represents the scenario where the job was highly efficient (i.e. very high utilization) with an allocation that was less than its desire. Thus, the job is probably able to use more processors than it was allocated. FIG. 4 shows two possible actions. The first is to keep the desire constant. The rationale is that since the job did not receive its desire, requesting the same desire may result in a higher allocation. The second alternative action is to base the new desire on the previous allocation. Using the fact that the job was highly efficient at this allocation, the new desire is an increase over that previous allocation. This increase, shown as $\rho_3$, may be multiplicative, additive, or some other type and may be the same as $\rho_1$ or $\rho_2$, or may be a different value. Finally, Box VI represents the scenario where the job was highly efficient at its requested desire. Thus, the desire is increased during the next scheduling quantum. The amount of increase, shown as $\rho_4$, may be multiplicative or additive, and may be the same as $\rho_1$, $\rho_2$ or $\rho_3$, or may be a different value.

Those skilled in the art can appreciate that the combination of these two metrics; job efficiency and allocation to desire ratio; can be used to create a multitude of matrices and rules. Moreover, one of ordinary skill in the art can easily understand that other metrics might be taken into account, such as the time spent by jobs performing I/O, time waiting on memory, computer cycles, I/O events, power consumption or number of cache misses, just to name a few. These metrics would provide additional matrices and rules under which the invention could operate. The present invention is not limited to a specific implementation or set of rules.

In a second embodiment, the task scheduler utilizes two parameters, its utilization or efficiency, and its allocation to determine its desire for the next scheduling quantum. In this embodiment, the previous desire is not used to calculate the desire for the next quanta. Rather, the task scheduler only uses its efficiency and its previous allocation in making this desire determination. FIG. 5 illustrates a representative matrix using only these two parameters. The task scheduler determines the utilization and categorizes it an inefficient, efficient or highly efficient. Alternatively, the task scheduler may simply categorize the utilization in two categories. As a further alternative, it can categorize in more than 3 categories. The utilization alone then determines the desire for the next quantum. In Box I, the job was unable to utilize the allocation that it received. Therefore, its desire for the next scheduling quantum is reduced from its present allocation as a function of an amount $\rho_1$. In Box II, the job was able to utilize the allocation that it received. Therefore, the task scheduler will request a desire that equals its previous allocation. Finally, in Box III, the job utilized virtually all of its allocation. Therefore, its desire will be its previous allocation, increased as a function of an amount $\rho_2$. Note that $\rho_1$ and $\rho_2$ may be additive or multiplicative in nature and may be the same or different values. Note that the matrix of FIG. 5 can be reduced further if the utilization is categorized as either efficient or inefficient. In that scenario, Box II is simply eliminated from the matrix.

Additionally, although the previous examples described the task scheduler as determining its desired allocation in quantitative terms, the invention is not so limited. For example, the task scheduler may use the above calculations to send an indication of its desire to the job scheduler. For example, the task scheduler may indicate its desire as compared to its previous allocation. In this case, the task scheduler would indicate its desire in relative, or qualitative, terms. In one embodiment, the task scheduler produces one of three outputs, such as "less", "same" or "more" than its previous allocation. In another embodiment, the task scheduler further refines its indication of desire by utilizing additional terms, such as "much less" and "much more". Similarly, the task scheduler may supply relative numerical values, such as "+1", or "−2", to indicate its desired allocation in relation to its previous desire or allocation. By using qualitative terms, the job scheduler may have additional freedom in determining the allocation of processes for each job. Therefore, the task scheduler's indication of desired allocation can be either a quantitative value, where the task scheduler supplies an actual requested number of processors; or a qualitative value, where the task scheduler supplies a value which is relative to a previous allocation or desire. The term "indication of desired allocation" is intended to denote both types of values.

Furthermore, although the above description discloses that the task scheduler always reports its requested desire, or an indication of its desire, to the job scheduler, this is not a requirement of the present invention. In another embodiment, it is possible that the task scheduler performs its calculations as described above and does not pass the results to the job scheduler. For example, it might report a new desire only if the change in desire is significant compared to the previously reported desire. This embodiment might be preferable if reporting the desire or changing the allotment incurs a high overhead, and therefore, the system might take these actions only if it leads to significant improvement in the utilization. In another embodiment, the task scheduler might only report small changes in desire. If it requires a large change in allotment, it might report the change in stages instead of requesting a large number of processors all at once. This approach might be preferable if the task scheduler is not capable of handling a large change in resources at once, cannot accurately estimate its desire, or if changing the allotment at once incurs larger overhead than changing it slowly. This may be more significant when the desire of a job decreases. In this case, the task scheduler might not want to release a large number of processors all at once due to potential cache and memory issues.

To implement the above task schedulers, it is typically necessary to determine several parameters; such as the allocation to desire ratio (i.e. $a_{q-1}/d_{q-1}$), and job efficiency. The first parameter is relatively straightforward and is easily calculated by the task scheduler. Those of ordinary skill in the art can determine this ratio. The second parameter, job efficiency, is less straightforward. Efficiency is the job's utilization or usage divided by the total number of processing resources allotted to the job. In the case where processors are dedicated to a particular job for a quantum, the total processor time available to that job is given by the allocation of processors ($a_q$) multiplied by the length of the scheduling quantum (L), or $L*a_q$. In the case where the allotted processors may be interrupted for some activities other than the job execution, the total processor time available can still be calculated. In this scenario, a call to a scheduling routine before and after the interruption can be used to record the time spent working on activities other than the assigned job. This time can then be subtracted from the total processor time available, as calculated above. Therefore, the job can calculate efficiency by computing its usage or waste.

Thus, the efficiency of the job is preferably calculated by determining the amount of processor resources that were available to the job during a specific quantum, and also determining the amount of wasted time, or the number of waste cycles incurred, during the same time period. The efficiency can then be defined as $(L*a_q-W)/(L*a_q)$. Alternatively, the efficiency can be computed by determining the amount of usage U, and then efficiency is defined as $U/(L*a_q)$. Alternatively, the task scheduler might compute inefficiency, defined by the waste divided by the total processor resources allotted.

In one embodiment, the task scheduler can calculate its usage by recording the wasted time or the usage for each allotted processor during a quantum.

In general, time in a computer system can be measured in many different ways. It can be calculated using a timer provided by the computer or operating system (such as the Unix system call gettimeofday), or it could use a performance counter (as is described in Chapter 7 of the Intel Architecture Optimization Manual, Intel. Corporation, Order Number 242816-003, 1997) provided by the hardware, or by any other means.

In one embodiment, when a processor completes its work, a task-scheduling routine immediately begins executing on the idle processor. Such a scheduling routine will attempt to get work from a pool of ready tasks. This routine is implemented so as to update the wasted time for the processor by recording the elapsed time from the moment that the processor runs out of work to the moment that the processor starts to execute a ready task. For example, a routine can be called immediately after the scheduling routine begins, recording the system time. When new work has been found, the routine will be called again, recording the system time again. The difference between these two system times defines the time wasted. Alternatively, a timer can be utilized which begins counting when the scheduling routine begins, and terminates when the processor beings executing new work. The value of the timer defines the time wasted.

Alternatively, the time stamp routine can be called when the processor begins executing useful work, and is called a second time when the useful work is completed. In this case, the difference between the two times defines the time spent doing useful work. This time can then, either explicitly or implicitly, be subtracted from the total time to obtain the time wasted.

One may also measure time by counting events, and explicitly or implicitly multiplying the count by the estimated time per event. Similarly, the system can simply use the counts themselves as estimates of time. Many other variations on measuring time or estimated time are possible.

Alternatively, if the different activities consume different amounts of power, then the time spent on an activity can be measured by simply measuring the power usage of the processor. Alternatively, the program may artificially increase/decrease the power usage of an activity to measure the time using the power consumption. Finally, the processor may also simply enable the charging of a storage element, such as a capacitor, during the period during which the process is idle (or busy). The voltage across the capacitor is a measure of the time spent executing that routine.

Thus individual processors may either collect their usage or waste information. The waste or usage of the entire job can be computed by collecting this information from the individual processors. In one embodiment, a centralized and exact measurement system is used. In this embodiment, a particular processor is responsible for computing the usage. At the end of a scheduling quantum, the designated processor can contact all the other processors and request their individual utilization numbers and add them to get the total usage. Each processor may calculate their usage using the routines described above. Alternatively, all the other processors can directly add their utilization to a usage counter at the end of the quantum, and the designated processor simply reads it. This technique is preferable when the number of processors allotted to the job is small.

Other measurement systems are also possible, and may collect exact, approximate or out-of-date data. Additionally, the measurement process can be centralized or distributed. The following examples illustrate other mechanisms that can be used to measure usage, and therefore efficiency.

In another embodiment, a distributed and exact measurement system is used. In this embodiment, the usage can be measured using some distributed structure like a counting tree. The processors are arranged as the leaves of a binary tree structure. At the end of the quantum, the processors add the utilization at the leaves and the utilization is added going up the tree. The total usage is available at the root of the tree. This technique may be preferable to the centralized technique when the number of processors allotted to a job is large.

In another embodiment, an out-of-date measurement is performed. Both the above described methods can be used for out-of-date measurement to start adding the processors' utilization before the quantum finishes. By using out-of-date measurements, the processors can continue working while the usage is being calculated.

In another embodiment, an approximate measurement is made. There are many methods to compute the utilization approximately. Only one of them is outlined below. Assume that the processor allotment of the job in this quantum is $a_q$. A usage counter is maintained in a centralized location, and it is set to $L*a_q$ (which represents the total number of processor cycles in the quantum) at the beginning of a quantum, where L is the number of allotted processors. In every step when a particular processor is not working, the processor decrements the counter by $a_q$ with probability $1/a_q$. The count at the end of the quantum is the approximate measure of the usage.

While the above description demonstrates that counters can be utilized to measure time or estimated time, not all uses of counters perform this function. For example, the use of a counter to count cache hits and a second to counter cache misses may provide valuable information concerning cache efficiency. However, these two values, without any of information, do not provide any information about the efficiency of the job, as defined above. Thus, the use of counters does not necessarily indicate or demonstrate that time is being measured.

Other methods of approximate measurement exist as well. For example, in one embodiment, every processor individually maintains its usage using an exact measurement technique, and a particular processor is responsible for computing the approximate usage. At the end of a quantum, this designated processor, instead of querying all the processors, only queries a subset of them, and extrapolates the usage of all processors using only these queries. The task scheduler can also compute an out-of-date and approximate usage using this technique, since the designated processor can start querying the processors before the quantum ends.

In another approximate technique, the designated processor maintains a counter for usage. If the queried processor is working at the time, the usage counter is incremented by $a_q$. If the queried processor is idle, or is doing something that is not considered useful work, then the counter is not incremented. At the end of the quantum, this usage is an approximation of the actual usage.

Approximate usage measurements are useful when the number of processors allotted to the job is large and the communication between processors is expensive.

While job efficiency is typically based on the time spent executing useful work as a ratio to the total time, this is not a requirement. For example, instead of measuring time or estimated time, the task scheduler can use other metrics to determine efficiency. For example, other resources such as the amount of computer cycles, cache misses, I/O events, or power consumed can all be used to determine job efficiency. In any case, efficiency is defined as the resources spent executing useful work as a ratio to the total resources available.

The second aspect of the present invention is a task scheduler for use in a work-stealing environment. As described earlier, in a work-stealing environment, new work created by a processor, such as newly created tasks, are added to that processor's ready queue. Idle processors (i.e. processors whose ready queues are empty) become thieves and attempt to "steal" work from the ready queues of other processors, known as victims. This action can be successful, in which case the thief now has work to execute. Alternatively, this action could result in an unsuccessful steal, where the targeted victim has no available work. In this case, the thief attempts to steal from another processor.

Earlier it was described that the task scheduler requests a desire for processor resources and the job scheduler grants an allocation. This process has several ramifications in the work-stealing environment. First, assume that there are N processors assigned to a job during the current quantum. Because of the nature of work-stealing, there will be N active ready queues associated with that job. During the next time quantum, there are three possible outcomes; the allocation could increase, decrease or remain the same.

If the allocation in the next quantum is less than the current allocation (i.e. $a_{q+1} < a_q$), fewer processors are assigned to this job. Consequently, although there were N active ready queues during the last quantum, some of these ready queues will not be active during this quantum. As a result, there may be non-empty ready queues without an associated processor. These dormant ready queues are referred to as muggable queues.

If the allocation in the next quantum is the same as the current allocation (i.e. $a_{q+1} = a_q$), then these same ready queues are used by the allocated processors. Thus, the job continues executing as it had been during the previous quantum.

If the allocation in the next quantum is increased over the current allocation (i.e. $a_{q+1} > a_q$), there will be additional processors added to the job. Since there were only N active ready queues associated with this job, the newly added processors will have to steal work. There are two potential activities that the new processors can engage in. First, the new processor looks to take over a "muggable" ready queue. Recall that "muggable" queues were those with work for this job, but without an associated processor (typically due to an earlier reduction in processor allocation). This is the first priority, since this work is not being actively worked on. If there are no "muggable" queues, the new processor will look to steal work from a "victim" processor. Note that when the new processor takes a "muggable" queue, it acquires the entire queue of work. However, when a processor steals, it acquires only one entry in the "victim" processor's ready queue.

These previous descriptions are directed at those activities that occur at the beginning of a quantum, where a new allocation has occurred. However, the "stealing" and "mugging" activities are employed at other times as well. For example, whenever a processor exhausts its ready queue, it looks for additional work. It follows the priority scheme detailed above, in which it looks first to mug an inactive ready queue, and if unsuccessful, look a steal from a "victim" processor. Furthermore, as described above, "steals" can be successful, or unsuccessful. Thus, there are a number of different activities that a particular processor can be involved in. The processor may be working on the assigned job, it may be "mugging" an inactive ready queue, or it may be "stealing" work from another processor. Note that the "steal" activity can be further divided into successful and unsuccessful steals.

The work-stealing task scheduler utilizes the same matrix and concepts explained above with respect to the work-sharing task scheduler. In other words, it uses the efficiency, and the allocation to desire ratio to determine the next desire. Efficiency is calculated differently for a work-stealing system. In one embodiment, the different activities enumerated above (i.e. working, mugging, successful stealing, unsuccessful stealing) are all monitored and the amount of time spent on each activity is recorded. Monitoring involves measuring the time spent on some or all of these activities, or counting the number of cycles spent performing some or all of these activities, using one or more of the techniques described earlier. Then, the task scheduler uses some or all of these recorded values, in comparison to the total processor time allocated, to determine efficiency.

For example, in one embodiment, the task scheduler defines useful work as equal to the amount of time spent working on the job. Thus, time spent searching for new work when the processor has exhausted its own ready queue is considered waste. In another embodiment, the useful work is defined as the amount of time spent working added to the time spent mugging. The rationale behind this approach is that a "mugging" results in the acquisition of an entire ready queue, and thus was a useful activity in itself. Steal activity is not counted as useful work since it results in the acquisition of only a single item. In yet another embodiment, the useful work is defined as the amount of time spent working added to the time spent mugging added to the time spent on successful steals. This approach rewards all activities that result in a processor acquiring work, no matter the quantity of the acquired work.

Similar to the techniques described above, it is possible to determine each of the parameters described above. For example, when a processor exhausted its ready queue, it first looks to "mug" an available ready queue. At the commencement of this action, a call is made to a routine to track the time spent on the mugging action. Similar routines can be called when the processor initiates stealing activity.

Figure 6:
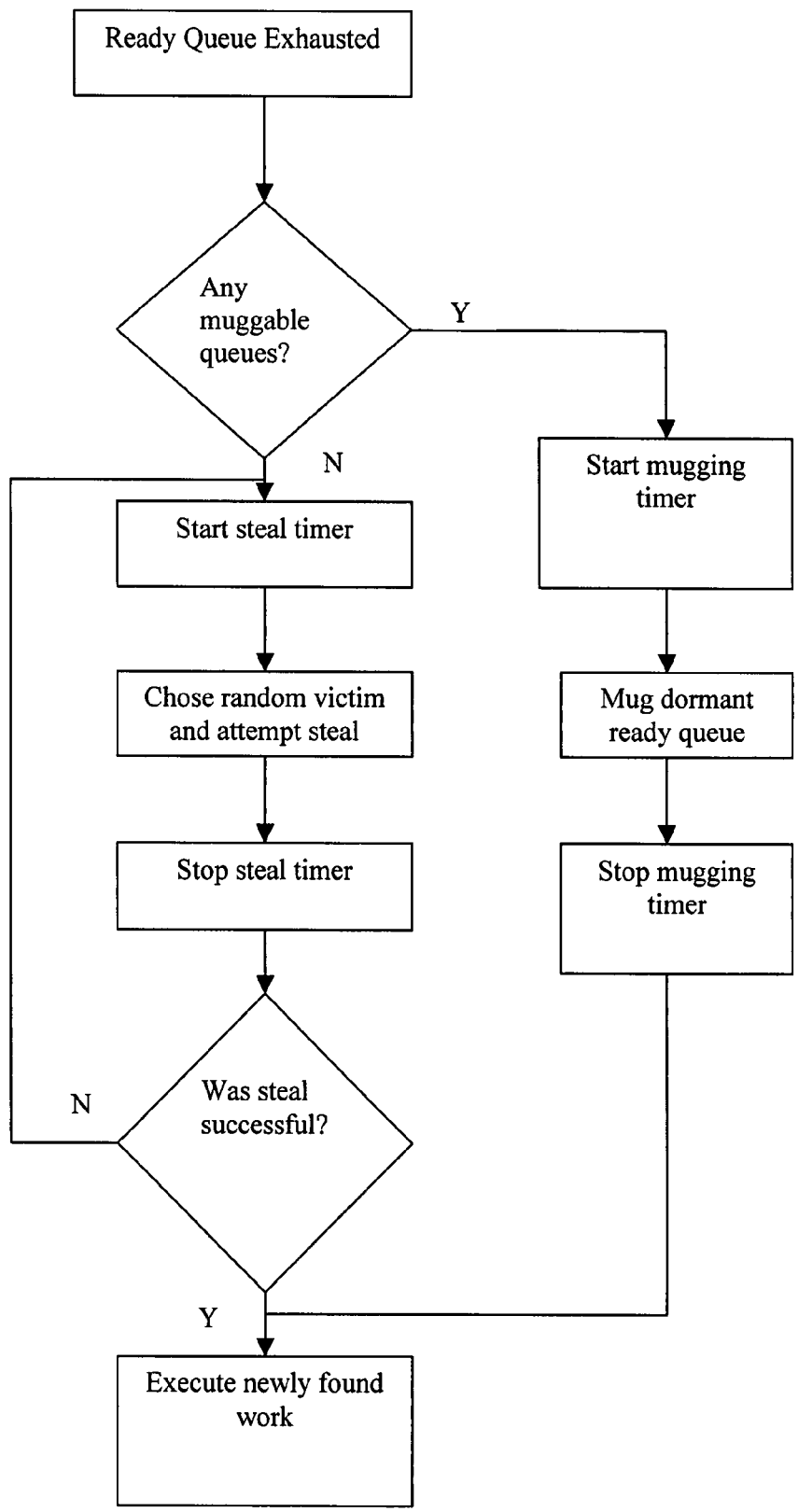
FIG. 6 illustrates a representative flowchart depicting the actions of an idle processor in a work-stealing environment.

The flowchart in FIG. 6 shows a representative example of the process that a processor executes when it has exhausted its own ready queue. Since "mugging" is preferable to "stealing", the processor first checks if there are any "muggable" queues available. If so, a routine is called to start its "mugging" timer (or to record the system time) and the processor takes over the inactive ready queue. At the conclusion of this process, a routine is called to determine the amount of time spent on the mugging activity (either by stopping the mugging timer, or by recording the system time and subtracting the previously recorded time from this time). If there are no muggable queues, the processor looks to steal work from another processor. A routine is called to start the steal timer. The processor then chooses a random victim and attempts to steal work. At the end of this activity, the routine is called to stop the "steal" timer. The operation of the "steal" timer is analogous to that of the "mugging" timer. If the steal was successful, the processor begins execution of the new work. If the steal was unsuccessful, the processor repeats the above steps until new work is found. In one embodiment, the time spent on all steal activities is aggregated, regardless of the outcome of the steal attempt. In another embodiment, the time spent on steal activities is segregated into the time spent on successful steals and the time spent on unsuccessful steals.

These timers are reset at the start of each new scheduling quantum and are accumulated, such as using one of the methods described above. The task scheduler then computes its efficiency. As described above, the non-utilization, or inefficiency, is given by the total amount of waste divided by the total processor time available. In the case where processors are dedicated to a particular job for a quantum, the total processor time available to that job is given by the allocation of processors ($a_q$) multiplied by the length of the scheduling quantum (L), or $L*a_q$. In the case where the allotted processors may be interrupted for some activities other than the job execution, the total processor time available can still be calculated. In this scenario, a call to a scheduling routine before and after the interruption can be used to record the time spent working on activities other than the assigned job. This time can then be subtracted from the total processor time available, as calculated above.

In another embodiment, to calculate time, the system can simply count one or more types of events (e.g. steals, successful steals, mugs, etc.) and implicitly or explicitly multiply by the time or estimated time per event. Similarly, the system can simply use the counts themselves as estimates of time. Many other variations on calculating time or estimated time are possible.

As stated earlier, waste (W) in a work-stealing environment can be defined in several ways. In one embodiment, all non-working activities (mugging and stealing) are considered waste. In another embodiment, all stealing activities (whether successful or unsuccessful) are considered waste. In another embodiment, only non-successful steal activity is considered waste. In yet another embodiment, non-working activities (such as stealing and mugging) are considered to be somewhat useful. Thus, a percentage of the time spent on these activities is defined to be useful and the remainder of this time is treated as waste. For example, the algorithm may define waste to be 100% of the time spent on unsuccessful steals, plus 50% of the time spent on successful steals, plus 25% of the time spent on mugging. These percentages are just examples; the algorithm can adjust these parameters to be any values between 0 and 100%, as desired, based on the implementation. In all of these scenarios, the efficiency is defined as $(L*a_q-W)/(L*a_q)$, where waste is defined based on the various processor activities. Based on the calculated efficiency, the work-stealing task scheduler requests its desire based on the algorithms described earlier and in FIGS. 2-5.

Thus, the task scheduler can be defined so that the resources consumed performing a particular activity either positively or negatively correlate to the job efficiency. For example, the task scheduler can be defined such that resources consumed performing mugging cycles are considered useful work, only 50% of the resources consumed performing successful steal are considered useful work, and all resources consumed performing unsuccessful steals are considered waste. In this scenario, the resources measured performing mugging cycles positively correlate to efficiency, a portion of the resources measured performing successful steals positively correlate to efficiency, and the resources measured performing unsuccessful steals negatively correlate to efficiency.

As explained above, the algorithm records the resources spent by each activity and uses these recorded values to calculate efficiency. To do so, each type of activity is defined as either waste or useful work. This can be done in several ways. A software program may count and define the various activities in several ways. It might use a branch statement such as C's if, select or case statement. Alternatively, it might store the various counts/times in a struct, and increment the appropriate field. It might also just store the counts/times of the various activities in different locations, and just increment the appropriate location. The definition of a particular activity need not be perfect. As long as the software defines activities approximately correctly, the algorithm will still work. For example, the program may only count mugging cycles with some probability. In general, if an activity is defined as useful work, the job efficiency will increase. Conversely, if an activity is defined as waste, the job efficiency will decrease.

The previous description defined a task scheduler for use in a work-sharing environment and a task scheduler for use in a work-stealing environment. In both cases, the task scheduler needs to be mated with a job scheduler. In one embodiment, a job scheduler utilizing dynamic equipartitioning (DEQ) can be employed. The combination of each of these task schedulers with a DEQ job scheduler has been studied and shown to work effectively. A variety of performance metrics, such as completion time, mean response time and makespan, have been modeled and shown to be reasonably close to the theoretical minimum values.

However, this invention is not limited to DEQ as the job scheduler. Other job schedulers can be utilized with the present invention. For example, another job scheduler partitions processors proportional to the desires of the jobs. Suppose that there are 12 processors and three jobs with desires of 6, 6, and 12, respectively. As described above, DEQ would allocate an equal number of processors to each job, up to a maximum of its desire. Thus, in the above example, each job would receive 12/3, or 4 processors. However, the proportional partitioning job scheduler utilizes information concerning the desire of each job in determining its allocation. In the above case, each job would be allocated processors in proportional to its desire. Therefore, the three jobs would be allocated 3, 3, and 6 processors, respectively. In other words, a particular job's allocation is given by:

P(# of processors)*Job's desire/($\Sigma$ of all jobs' desires)

In one embodiment, the previously described task and job schedulers are resident in the memory subsystem of a multiprocessor system. As stated earlier, the job scheduler is preferred part of the operating system while the task schedulers are associated with individual jobs. However, these schedulers need not be in memory. For example, in a multiprocessor system comprising a plurality of processor chips, the task scheduler may be resident in the ROM (read only memory) or in the microcode which is programmed within the processor chip. Thus, any media which is readable by the processor can be used to store the task and job schedulers described above.

What is claimed is:

1. A non-transitory computer-readable medium storing a plurality of computer executable instructions which, when executed, perform a method of generating an indication of a particular job's desired processor allocation, where said indication is to be used to allocate processing resources among a plurality of jobs in a multiprocessor computer system in a work-stealing environment, said method comprising:
   a. measuring the time spent by said particular job performing at least one of a plurality of activities, said activities selected from the group consisting of mugging cycles, steal cycles, unsuccessful steal cycles, successful steal cycles, and waste, and
   b. generating, responsive to said measurement, an indication of a desired processor allocation.

2. The non-transitory computer-readable medium of claim 1, wherein said step of measuring time comprises obtaining an indication of time when said particular job begins to perform at least one of said plurality of activities, obtaining a second indication of time when said particular job terminates performance of said at least one of said plurality of activities, and determining the difference between said two obtained indications of time.

3. The non-transitory computer-readable medium of claim 1, wherein said step of measuring time comprises starting a timer when said particular job begins to perform at least one of said plurality of activities, and stopping said timer when said particular job terminates performance of said at least one of said plurality of activities.

4. The non-transitory computer-readable medium of claim 1, wherein said step of measuring time comprises updating a counter during said performance of said at least one of said plurality of activities.

5. The non-transitory computer-readable medium of claim 1, wherein said step of measuring time comprises measuring the power consumed during said performance of at least one of said plurality of activities.

6. The non-transitory computer-readable medium of claim 1, wherein said activities comprise mugging cycles.

7. The non-transitory computer-readable medium of claim 1, wherein said activities comprise steal cycles.

8. The non-transitory computer-readable medium of claim 1, wherein said activities comprise unsuccessful steal cycles.

9. The non-transitory computer-readable medium of claim 1, wherein said activities comprise successful steal cycles.

10. The non-transitory computer-readable medium of claim 1, wherein said indication of a desired processor allocation comprises a number of desired processors.

11. The non-transitory computer-readable medium of claim 1, wherein said measuring and generating steps are performed on a recurring basis.

12. The non-transitory computer-readable medium of claim 11, wherein said indication of a desired processor allocation is relative to a previous processor allocation.

13. The non-transitory computer-readable medium of claim 11, wherein said indication of a desired processor allocation is relative to a previous desired indication of processor allocation.

14. A non-transitory computer-readable medium storing a plurality of computer executable instructions which, when executed, perform a method of generating an indication of a particular job's desired processor allocation, where said indication is to be used to allocate processing resources among a plurality of jobs in a multiprocessor computer system in a work-stealing environment, said method comprising:
   a. measuring the resources spent by said particular job performing at least one of a plurality of activities, said activities selected from the group consisting of mugging cycles, steal cycles, unsuccessful steal cycles, successful steal cycles, and waste,
   b. determining, responsive to said measurement, an efficiency of said particular job, where said efficiency is a measure of the useful work performed by said job, and
   c. generating an indication of a desired processor allocation for said particular job, responsive to said efficiency.

15. The non-transitory computer-readable medium of claim 14, wherein said resources comprise time.

16. The non-transitory computer-readable medium of claim 14, wherein said resources are selected from the group consisting of computer cycles, cache misses, I/O events, cache hits, and power consumption.

17. The non-transitory computer-readable medium of claim 14, wherein said activities comprise mugging cycles and said resources measured performing mugging cycles positively correlate to said efficiency.

18. The non-transitory computer-readable medium of claim 14, wherein said activities comprise mugging cycles and said resources measured performing mugging cycles negatively correlate to said efficiency.

19. The non-transitory computer-readable medium of claim 14, wherein said activities comprise steal cycles and said resources measured performing steal cycles positively correlate to said efficiency.

20. The non-transitory computer-readable medium of claim 14, wherein said activities comprise steal cycles and said resources measured performing steal cycles negatively correlate to said efficiency.

21. The non-transitory computer-readable medium of claim 14, wherein said activities comprise successful steal cycles and said resources measured performing successful steal cycles positively correlate to said efficiency.

22. The non-transitory computer-readable medium of claim 14, wherein said activities comprise successful steal cycles and said resources measured performing successful steal cycles negatively correlate to said efficiency.

23. The non-transitory computer-readable medium of claim 14, wherein said activities comprise unsuccessful steal cycles and said resources measured performing unsuccessful steal cycles positively correlate to said efficiency.

24. The non-transitory computer-readable medium of claim 14, wherein said activities comprise unsuccessful steal cycles and said resources measured performing steal cycles negatively correlate to said efficiency.

25. The non-transitory computer-readable medium of claim 14, wherein said indication of said desired allocation is generated on a recurring basis and said indication of desired allocation is responsive to a previous indication of desired allocation.

26. The non-transitory computer-readable medium of claim 25, wherein said indication of desired allocation is reduced from a previous indication of desired allocation if said efficiency is less than a first value.

27. The non-transitory computer-readable medium of claim 25, wherein said indication of desired allocation is increased from a previous indication of desired allocation if said efficiency is greater than a second value.

28. The non-transitory computer-readable medium of claim 14, wherein said indication of said desired allocation is generated on a recurring basis and said indication of desired allocation is responsive to a previous allocation.

29. The non-transitory computer-readable medium of claim 28, wherein said indication of desired allocation is reduced from a previous allocation if said efficiency is less than a first value.

30. The non-transitory computer-readable medium of claim 28, wherein said indication of desired allocation is increased from a previous allocation if said efficiency is greater than a second value.

31. The non-transitory computer-readable medium of claim 14, wherein said measuring is performed over a time period and said indication of desired allocation is generated at the end of said time period.

32. The non-transitory computer-readable medium claim 31, wherein said time period is of fixed duration.

33. The non-transitory computer-readable medium of claim 14, wherein said indication of desired processor allocation is adapted to be used with a job scheduler utilizing a dynamic equipartitioning algorithm.

* * * * *